(12) United States Patent
Thurimella et al.

(10) Patent No.: US 11,546,419 B2
(45) Date of Patent: *Jan. 3, 2023

(54) METHODS, DEVICES AND SYSTEMS FOR A DISTRIBUTED COORDINATION ENGINE-BASED EXCHANGE THAT IMPLEMENTS A BLOCKCHAIN DISTRIBUTED LEDGER

(71) Applicant: WANdisco Inc., San Ramon, CA (US)

(72) Inventors: Ramakrishna Thurimella, San Francisco, CA (US); Yeturu Aahlad, Foster City, CA (US)

(73) Assignee: WANdisco Inc., San Ramon, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/585,103

(22) Filed: Jan. 26, 2022

(65) Prior Publication Data
US 2022/0337657 A1 Oct. 20, 2022

Related U.S. Application Data

(63) Continuation of application No. 17/096,825, filed on Nov. 12, 2020, now Pat. No. 11,336,713, which is a
(Continued)

(51) Int. Cl.
*H04L 67/10* (2022.01)
*G06Q 40/04* (2012.01)
(Continued)

(52) U.S. Cl.
CPC .......... *H04L 67/10* (2013.01); *G06Q 20/389* (2013.01); *G06Q 40/04* (2013.01); *H04L 49/90* (2013.01)

(58) Field of Classification Search
CPC ....... H04L 67/10; H04L 49/90; G06Q 20/389; G06Q 40/04
See application file for complete search history.

(56) References Cited

U.S. PATENT DOCUMENTS

2006/0206758 A1 9/2006 Butterworth et al.
2008/0256543 A1 10/2008 Butterworth
(Continued)

OTHER PUBLICATIONS

First Examination Report dated Aug. 25, 2022 in corresponding Indian patent application 202037050639 (8 pages).
(Continued)

*Primary Examiner* — Austin J Moreau
(74) *Attorney, Agent, or Firm* — Young Law Firm, P.C.

(57) ABSTRACT

A distributed system that implements an online exchange may comprise a plurality of server nodes, each of which being configured to receive exchange transaction proposals from customers of the online exchange over a computer network and each being configured to store a copy of a blockchain distributed ledger of completed exchange transactions. A consensus engine may be coupled, over the computer network, to the plurality of server nodes and may receive a plurality of exchange transaction proposals from the plurality of server nodes. The consensus engine may be being further configured to achieve consensus on the plurality of exchange transaction proposals and to generate, in response, an ordering of agreed-upon exchange transaction proposals that includes the plurality of exchange transaction proposals on which consensus has been reached. This ordering of agreed-upon exchange transaction proposals is identically provided to each of the server nodes and specifies the order in which the server nodes are to execute exchange transactions and to update their copy of the distributed ledger. The ordering of agreed-upon exchange transaction proposals may optionally be re-ordered and identically provided to each server node to conform to the local orderings at the exchange transaction proposal's node server of origin.

26 Claims, 6 Drawing Sheets

Related U.S. Application Data continuation of application No. 16/026,876, filed on Jul. 3, 2018, now Pat. No. 10,855,749.

(51) Int. Cl.
*G06Q 20/38* (2012.01)
*H04L 49/90* (2022.01)

(56) References Cited

U.S. PATENT DOCUMENTS

| | | | |
|---|---|---|---|
| 2011/0302449 A1 | 12/2011 | Douceur et al. | |
| 2015/0067004 A1* | 3/2015 | Shvachko | G06F 16/166 707/827 |
| 2016/0012424 A1 | 1/2016 | Simon | |
| 2016/0085955 A1 | 3/2016 | Lerner | |
| 2016/0234026 A1 | 8/2016 | Wilkins | |
| 2016/0321654 A1 | 11/2016 | Lesavich | |
| 2017/0046680 A1 | 2/2017 | Crites | |
| 2017/0109744 A1 | 4/2017 | Wilkins | |
| 2017/0124556 A1 | 5/2017 | Seger, II | |
| 2017/0140375 A1 | 5/2017 | Kunstel | |
| 2017/0140394 A1 | 5/2017 | Cao et al. | |
| 2017/0232300 A1 | 8/2017 | Tran et al. | |
| 2017/0236120 A1 | 8/2017 | Herlihy | |
| 2017/0243193 A1 | 8/2017 | Manian | |
| 2017/0243215 A1 | 8/2017 | Sifford | |
| 2017/0244757 A1 | 8/2017 | Castinado | |
| 2017/0289111 A1 | 10/2017 | Voell | |
| 2017/0338947 A1 | 11/2017 | Ateniese | |
| 2017/0344987 A1 | 11/2017 | Davis | |
| 2018/0041572 A1 | 2/2018 | Frasca et al. | |
| 2018/0068130 A1 | 3/2018 | Chan | |
| 2018/0075532 A1 | 3/2018 | Chenard | |
| 2018/0083771 A1 | 3/2018 | Bonnell | |
| 2018/0101557 A1 | 4/2018 | Ventura | |
| 2018/0101842 A1 | 4/2018 | Ventura | |
| 2018/0121909 A1 | 5/2018 | Christidis et al. | |
| 2018/0158034 A1* | 6/2018 | Hunt | G06Q 20/00 |
| 2018/0183901 A1* | 6/2018 | Lariviere | H04L 47/10 |
| 2018/0247376 A1 | 8/2018 | Rahul | |
| 2018/0248699 A1 | 8/2018 | Andrade | |
| 2018/0342036 A1 | 11/2018 | Zachari et al. | |
| 2019/0080392 A1 | 3/2019 | Youb et al. | |
| 2019/0334697 A1 | 10/2019 | Winslow | |
| 2019/0354397 A1* | 11/2019 | Goel | G06F 9/4881 |
| 2019/0392061 A1* | 12/2019 | Terry | G06F 16/2365 |

OTHER PUBLICATIONS

Untangling Blockchain: A Data Processing View of Blockchain Systems, Tien Tuan Anh Dinh et al., arXiv:1708.05665v1 [cs.DB] Aug. 17, 2017.

Hyperledger Fabric: A Distributed Operating System for Permissioned Blockchains, Elii Androulaki et al., arXiv:1801.10228V2 [cs.DC] Apr. 17, 2018.

Hileman, Garrick and Rauchs, Michel, 2017 Global Blockchain Benchmarking Study (Sep. 22, 2017). Available at SSRN: https://ssrn.com/abstract=3040224 or http://dx.doi.org/10.2139/ssrn.3040224.

The Distributed Coordination Engine (DConE) Technical White Paper, downloaded from https://www.wandisco.com/assets/bit1d792cb4d9252692/WANdisco_DConE_White_Paper.pdf on Sep. 6, 2018.

Blockchain Consensus Protocols in the Wild, Christian Cachin et al., arXiv:1707.01873 [cs.DC], Jul. 7, 2017.

Consensus in the Age of Blockchains, Shehar Bano et al., arXiv:1711.03936 [cs.CR] Nov. 14, 2017.

Bridging Paxos and Blockchain Consensus, Aleksey Charapko et al., downloaded from https://pdfs.semanticscholar.org/03cc/44aa3106062e3692144c4f07c58c606dbd5c.pdf on Sep. 6, 2018.

Blockchain, cryptography, and consensus, Dr. Christian Cachin, ITU Workshop on "Security Aspects of Blockchain" (Geneva, Switzerland, Mar. 21, 2017).

International Search Report and Written Opinion in PCT/US2019/35419 dated Aug. 21, 2019.

Christian Cachin et al. (Keynote Talk) Jul. 7, 2017 XP055692660 DOI:10.4230/LIPIcs.DISC.2017.1 Corpus ID: 46484969.

Rui Oliveira et al. "Hyperledger Fabric: a distributed operating system for permissioned biockchains" EuroSys '18: Proceedings of the Thirteenth EuroSys Conference Apr. 2018 Article No.: 30Pages 1-15https://doi.org/10.1145/3190508.3190538.

* cited by examiner

METHODS, DEVICES AND SYSTEMS FOR A DISTRIBUTED COORDINATION ENGINE-BASED EXCHANGE THAT IMPLEMENTS A BLOCKCHAIN DISTRIBUTED LEDGER

BACKGROUND

The field of the embodiments disclosed herein includes distributed systems. In particular, embodiments are drawn to a distributed system (and the functionality enabled thereby) that uses instances of a distributed coordination engine to implement an online exchange over a Wide Area Network (WAN) that may include, for example, the Internet. Embodiments are also drawn to methods, devices and systems for maintaining consistency of distributed and/or replicated ledgers in such a distributed system over a WAN. Other embodiments include methods and systems to implement secure marketplaces or exchanges using distributed ledger or blockchain technology.

DETAILED DESCRIPTION

Definitions

Figure 1:
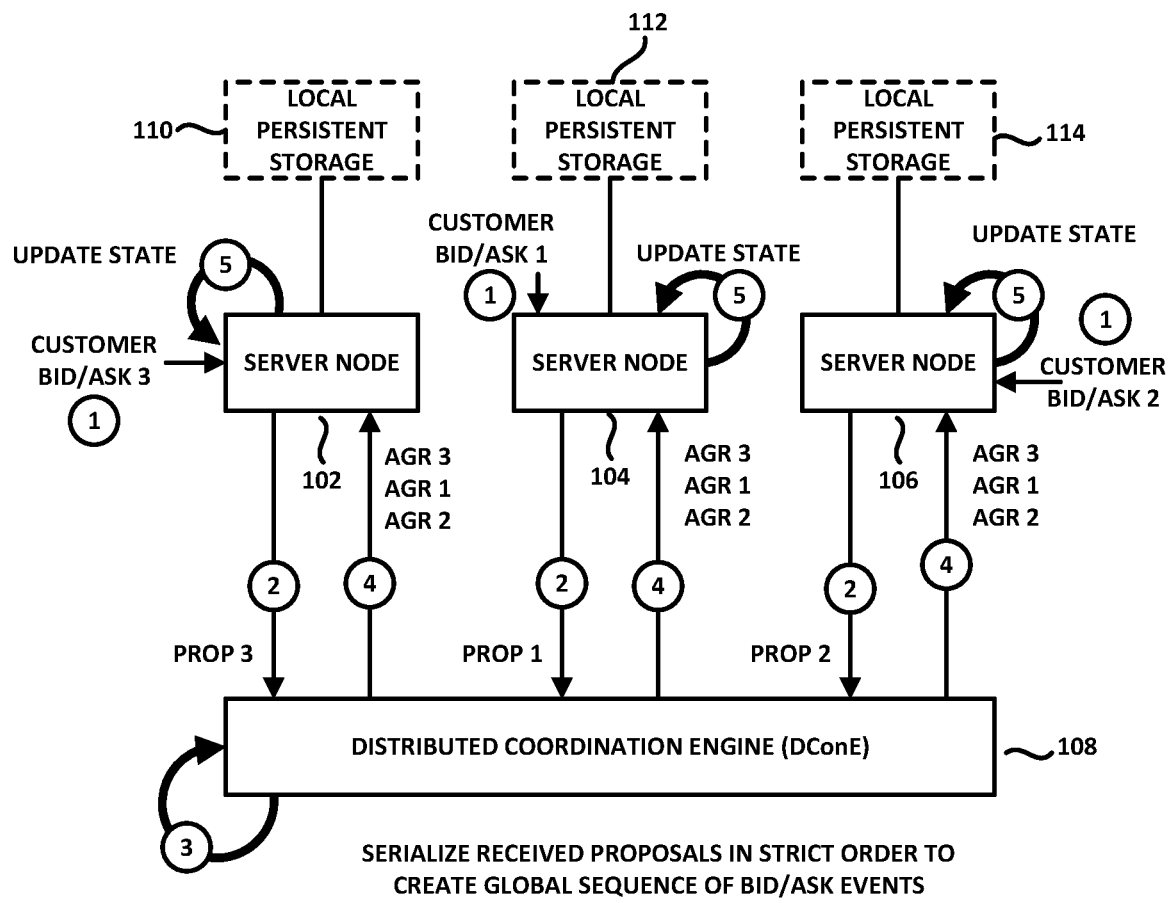
FIG. 1 is a block diagram of a system configured according to one embodiment.

Distributed system: A distributed system comprises a collection of distinct processes that may be spatially separated, and that may communicate with one another through the exchange of messages or events.

Agreements: An agreement is a selected one of a potential plurality of proposal events generated by Proposers and delivered to Learners.

Global sequence of agreements: According to one embodiment, bids or ask proposals are submitted to and agreed-upon by at least a majority of Acceptors and delivered in a global sequence of agreements. Server nodes receiving the global sequence of agreements may then execute the underlying transactions in the order specified by the global sequence of agreements and update their copy of the replicated ledger accordingly, thereby ensuring that all copies of the replicated ledger are updated in the same order.

Distributed agreement/co-ordination engine (DConE): One embodiment calls for an agreement or co-ordination engine to generate an ordered global sequence of agreed-upon transactions through a novel production-grade implementation of the Paxos consensus protocol. An exemplary DConE is described in commonly assigned and co-pending US patent application U.S. application Ser. No. 12/069,986 filed on Feb. 13, 2008, which is incorporated herein by reference in its entirety. DConE is a fault-tolerant, continuously available and deterministic replicated state machine. DConE works by collecting events generated by Proposers, organizing them into an ordered global sequence with the help of Acceptors and delivering them in that sequence to Learners. The Learners implement their business logic (implementing transactions the present exchange or marketplace, for example) by handling the ordered sequence of delivered events. DConE guarantees delivery of each transaction proposal event (a bid or an ask) at least once to each learner node in the same ordered global sequence of agreed-upon exchange transaction proposals.

Non-blocking: Herein, the term 'non-blocking' refers to the capability of a set of processes to remain fully or partly available while changes are made to that set.

Proposers: According to one embodiment, proposers are processes that are configured and enabled to suggest exchange transactions (i.e., to make bid or ask proposals).

Acceptors: According to one embodiment, acceptors are processes that are configured to participate in deciding on the order of proposals made by proposers. According to one embodiment, only when a majority of acceptors have determined that a proposal takes a particular place in the global sequence of agreements does it become an agreement (e.g., an agreed-upon proposal). Acceptors, according to one embodiment, may be configured to only participate in deciding on the order of agreements and do not reason/care about the underlying contents of the agreements (as described herein, the agreement's value is opaque to the DConE). Acceptors may be configured as application-independent entities.

Learners: According to one embodiment, learners learn of agreements made between the proposers and acceptors and apply the agreements in a deterministic order to the application through their output proposal sequence. In one embodiment, an agreement identity is provided, as is a persistent store that, for each replicated state machine, allows a sequence of agreements to be persistently recorded. Each proposal is guaranteed to be delivered at least once to each Learner in a particular membership.

Distributed Coordination Engine (DConE)

According to one embodiment, DConE implements an enhanced, enterprise version of the Paxos algorithm. Under the Paxos algorithm, a replicated state machine is installed with each node in the distributed system—in this case, a distributed online exchange. The replicated state machines then function as peers to deliver a cooperative approach to exchange transaction management that ensures the same transaction order at every node—although not necessarily at the same time. The replicated state machines at the server nodes that implement the Paxos algorithm can fill one of any three roles: (1) Proposers; (2) Acceptors; and (3) Learners. There are three phases in the Paxos algorithm, which may be repeated during the process of reaching consensus: (1) election of a node to be the coordinator or Proposer; (2) broadcast of the transaction proposal to its peers that then assume the role of Learners, who either accept or reject the proposal; and (3) acceptance, once a majority of the nodes acknowledge the Proposer and accept its proposal, allowing consensus to be reached. The replicated state machine that assumed the role of coordinator then broadcasts a commit message to notify all of its peers to proceed with the transaction.

To avoid scenarios where multiple nodes try to act as coordinators for the same proposal, Paxos assigns an ordering to the successive coordinator nodes and restricts each coordinator's choice in selecting a value to be agreed upon for the proposal number. To support this, each node keeps track of the most recent agreed proposal sequence number that it has seen. When a node issues a proposal (in this case, a bid or an ask), it generates a sequence number for the proposal with a value higher than the last one it is aware of and broadcasts it to the other nodes. If a majority of the other nodes reply indicating they have not seen a higher sequence number, the node is then allowed to act as coordinator, or leader for the proposal. At this point, the other coordinators cannot proceed until consensus is reached on the current proposal. The proposer's sequence number cannot be used by other nodes attempting to be coordinator at the same time, and all future proposals must use a higher sequence number to achieve consensus for future transactions.

Achieving Consensus with DConE

In order to understand DConE's approach to distributed transaction processing, the following details the core components of each DConE instance that support its active-active replication capability: the proposal manager, the local sequencer, the agreement manager, and the global sequencer. When a Bid or Ask transaction is submitted to the Exchange for processing by a customer at any node, the proposal manager component of the local instance of DConE generates a proposal for the transaction, which includes the transaction data. Such transaction data may include at least the ID of the buyer or seller, the amount to buy or sell and the price. The DConE instance then assigns a local sequence number (LSN) to the proposal. The LSN reflects the order in which the transaction was submitted relative to all other transactions at that location. The LSNs need not be consecutive numbers, merely unique. The local sequencer then saves the proposal with the assigned local sequence number to its proposal log. If a network or server outage occurs before the local instance of DConE is able to submit the proposal to its peers during the agreement process described below, it will resubmit that proposal after it recovers.

Next, DConE's agreement manager determines an agreement number, which represents a proposed global sequence number (GSN) for the proposal that the local DConE instance will submit to its peers at other nodes. In accordance with Paxos, the agreement number is simply an increment of the GSN of the last proposal accepted by all of the nodes. This agreement number is then used to obtain consensus about the ordering of the exchange transaction across all of the nodes, so that one-copy equivalence is maintained. The proposal with the agreement number is then written to the agreement log. Each DConE instance's agreement log or replicated ledger contains at least all completed agreements, regardless of the server node at which the completed agreements originated. In the event of a network outage, the agreement log will indicate where the node left off before it lost its connection to the other nodes in the distributed system, making it useful during DConE's automated recovery process. The roles played in the recovery process by both the agreement log and the proposal log are described hereunder.

An agreement protocol is then initiated by the local DConE instance's agreement manager, and the proposal is submitted to its peers. Once a quorum of the DConE instance's peers reach agreement on the proposal, the agreement number is used as the GSN across all of the nodes as global transaction ordering has now been achieved. The quorum concept enables DConE to reach agreement without requiring that all nodes are available or agree. The quorum concept is a key element of DConE's performance as well as its fault tolerance. The quorum concept is also described hereunder.

If agreement is pre-empted by a competing proposal, the agreement manager repeatedly attempts to reach agreement with a new agreement number. Each time agreement is reattempted, an entry with the new agreement number is created in the agreement log. Once agreement is reached by a quorum, the local application node enqueues the agreed upon proposal in its global sequence. At this point the local DConE instance passes the transaction off to its respective locking scheduler for processing, in the agreed global sequence number order. It is important to note that the DConE instance where the proposal originated does not wait for any of the other nodes to complete execution of the transaction; it only waits for agreement to be reached, allowing users to experience LAN-speed performance.

Preserving the Local Sequence

Because DConE supports concurrent agreements for performance reasons, it is possible for the quorum to reach agreement out of order. That is, it is possible for an agreement to be reached on an exchange transaction proposal that was submitted after a prior-submitted and not yet agreed-upon exchange transaction proposal at another node.

Recall that DConE, takes exchange transaction proposals from multiple server nodes, collates them into a unique global order and makes it accessible to every other server node. Consider also an application such as AuX built on top of DConE. Sometimes it is desirable, for a given server node, to implement a first-come-first-served or First-in-First-Out (FIFO), process in handling of the exchange transaction proposals based on their time of arrival and make sure that they are output in the same order. This kind of ordering maybe mandated, for example, by a fairness policy or causal ordering constraint, which are two requirements that are met, according to one embodiment, by the capturing and reaching consensus on all exchange transaction proposals issued by the plurality of server nodes. For example, say $P_0$ is a proposal to open an account for a customer C and $P_t$ is a trade from customer C. Of course, the exchange should be constrained in its order of execution such that the customer C's account is opened before the customer C's trade $P_t$ is executed; namely, the order of execution on the output side should be constrained such that $P_0$ appears before $P_t$. Unfortunately, there is no solution for this policy if C submits $P_0$ and $P_t$ to two different nodes. However, when $P_0$ and $P_t$ are submitted to the same node, one embodiment satisfies this constraint by adding preprocessing and post-processing steps, described hereunder. Another example of the need to preserve the local sequence of transaction proposals in the globally-ordered sequence is in the banking sector. Indeed, consider a banking scenario in which a customer deposits a check and withdraws a portion of check in the form of cash. These transactions also must happen in that order, i.e. first deposit $P_0$ and then withdrawal $P_t$. As noted above, there is no solution for this policy if C submits $P_0$ and $P_t$ to two different nodes. The preprocessing step only annotates the proposal sequence and hence has no effect on correctness. Post-processing, on the other hand, rearranges the output of DConE. However, it does so in a deterministic way. As the output resulting from DConE is identical across all server nodes, a property of DConE, the output from the post-processing step will result in an identical sequence of agreement on all server nodes.

The following illustrates one embodiment that enables DConE to determine global transaction ordering while preserving the local sequence of submission of proposals.

Assume that a server node submits its first two exchange transaction proposals to DConE and the proposal manager assigns LSN 1 and LSN 2 to the respective exchange transaction proposals. Assume further that a total of 25 exchange transaction proposals with GSNs 1 through 25 have been agreed, and no intervening exchange transaction proposals have been submitted by the other server nodes. Assume further that the quorum reached agreement on LSN 2 before reaching agreement on LSN 1. If local sequence didn't matter to the application, then LSN 2 would have agreement number and GSN 26, and LSN 1 would have agreement number and GSN 27. The proposals would then be written in that order at all of the server nodes. If the requirement is to ensure that local sequence is preserved at all of the nodes regardless of where the proposals originate, one embodiment uses a combination of the LSN, the agreement number, which in this case may or may not end up being the GSN, and the proposer id, which represents a globally unique identifier for the DConE instance where the proposal originated, to construct a global sequence that preserves the local sequence order. In effect, the global sequence is sorted in local sequence order within proposer id and passed to the locking scheduler, discussed hereunder, at each server node. Another method of preserving the local sequence according to one embodiment is disclosed hereunder relative to FIG. 4.

The Locking Scheduler

The locking scheduler at each server node that DConE passes agreed-upon exchange transaction proposals to the exchange application running at each of the server nodes. The locking scheduler behaves like a database scheduler, not a distributed lock manager. The term "locking scheduler" comes from the fact that it relies on the locks specified by the exchange application for concurrency control, so that large numbers of non-conflicting transactions can be processed in parallel. The locking scheduler is agnostic with respect to the global order. The order in which the locking scheduler submits transactions to the underlying exchange application at each site is driven by a local queue of globally sequenced events (the GSN queue) passed to it from its respective DConE instance at that server node. This allows completely local locking schedulers at each server node to achieve one-copy equivalence without any knowledge of global state. It is the locking scheduler that interfaces with the underlying AuX application, and not DConE directly.

Achieving Performance and Scalability

DConE significantly extends the functionality of the Paxos algorithm, thereby enabling enhanced performance at scale. Such extended functionality includes quorum, concurrent agreement handling, backoff and collision avoidance, dynamic group evolution, distributed garbage collection, distinguished and fair round numbers for proposals and weak reservations, to identify but a few areas encompassed by such extended functionality.

Quorum

The quorum concept used by DConE allows performance to be optimized and the impact of network and server outages to be minimized based upon the distribution of customers of the exchange and trading activity across server nodes. The quorum configuration options that are available include majority, singleton and unanimous. It is anticipated that the exchange will operate with consensus being achieved by majority quorum, although singleton and unanimous consensus are also possible. In majority quorum, a majority of the server nodes are required to respond to any exchange transaction proposal. DConE also supports the concept of a distinguished node that can act as a tie-breaker in the event that there is an even number of server nodes in the distributed system. With a singleton quorum, only one node has to respond to exchange transaction proposals. The server node selected to be the singleton quorum under this configuration may be that server node having the greatest number of customers and level of trading activity. The benefit is that no wide area network (WAN) traffic is generated during the agreement process at the server node with the highest transaction volume. Agreement is handled entirely by the local DConE instance at the quorum node. The other server nodes submit their exchange transaction proposals to obtain agreement from the singleton quorum node, but typically experience fast performance because they only require the designated singleton server node to agree to their exchange transaction proposals, not complete execution of them, before they hand them off to their respective local locking schedulers. Unanimous quorum requires all server nodes to respond, and is inherently the least efficient configuration and the configuration that generates the most WAN traffic.

DConE also supports rotation of the quorum from one region to another based on a follow-the-sun model. This allows performance to be optimized on the basis of normal working hours at each site in a globally distributed system. In addition, the quorum approach works in combination with DConE's automated recovery features to minimize the impact of network outages and server crashes on a distributed system.

Concurrent Agreement

The Paxos algorithm only allows agreement to be reached on one proposal at a time. This has the obvious effect of slowing down performance in a high transaction volume environment. DConE allows multiple exchange transaction proposals from multiple exchange transaction proposers to progress simultaneously, rather than waiting for agreement to be reached by all or a quorum of the server nodes on a proposal by proposal basis.

Back-off and Collision Avoidance

DConE provides a backoff mechanism for avoiding repeated pre-emption of proposers by their peers. Conventional replicated state machines allow the preempted proposer to immediately initiate a new round with an agreement number higher than that of the pre-emptor. This approach can lead an agreement protocol to thrash for an extended period of time and severely degrade performance. With DConE, when a round is pre-empted, the DConE instance which initiated the proposal computes the duration of backoff delay. The proposer then waits for this duration before initiating the next round. DConE uses an approach similar to Carrier Sense Multiple Access/Collision Detection (CSMA/CD) protocols for nonswitched ethernet.

Automated Backup and Recovery

DConE's active-active replication capability delivers continuous hot backup by default by turning every server node into a mirror of every other. This is leveraged to provide automated recovery over a WAN, or a LAN when a server node falls behind due to network or server failures. No manual intervention is required. If a server node in the exchange loses contact with its peers, but is still available to exchange customers at its location, those exchange customers will still have read access to the exchange but will not be allowed to initiate exchange transactions, as the agreement process cannot proceed. This prevents a split-brain scenario from arising that would result in the server node going out of sync with its peers, thus violating the requirement for one copy equivalence across all of the server nodes. However, exchange transaction proposals can still be submitted at the remaining server nodes, provided that a quorum is still available. This minimizes the impact of network outages and server failures on the distributed system. As soon as the failed server node comes back online, its DConE instance catches up automatically with all of the exchange transaction proposals agreed by its peers while it was offline. This is accomplished by using the agreement log. The agreement log contains the last exchange transaction completed at the server node before the outage occurred. When the recovery process begins, the server node's DConE instance requests all exchange transactions after the last exchange transaction recorded in its agreement log from its peers. In addition, any exchange transaction proposals left in the proposal log that did not complete the agreement process are automatically resubmitted by the local DConE instance, once the catch-up is complete. This means that regardless of whether an outage occurs before or after agreement is reached on any exchange transaction proposals across the server nodes in a distributed system, no data will be lost.

In addition, DConE's automated recovery capabilities eliminate the need for disk mirroring solutions that only work over a LAN, not a WAN, and require administrator intervention to achieve recovery. As a result, these solutions can introduce the risk of extended downtime and data loss due to human error. Finally, DConE's automated recovery features also make it possible to take servers offline for maintenance without disrupting user access, since exchange customers can be redirected to a server node at another site while theirs is offline. This makes full 24-by-7 operation possible in a globally distributed environment.

For purposes of illustration, described herein is an example of an exchange or marketplace implementing a blockchain or distributed ledger based upon an implementation of DConE. A blockchain is a distributed ledger of intended changes to a distributed information repository. A permissioned blockchain or distributed ledger, as described herein relative to the exchange or marketplace, differentiates from public blockchains in that special permissions may be required to access and initiate transactions. The intrinsic configuration of such blockchains controls the participants' transactions (bids and asks, in this case) and defines their roles (buyers, sellers). The exchange or marketplace may also maintain the identity of each exchange customer on the network for security, auditing and tax purposes. A permissioned distributed blockchain may also differentiate itself from a public blockchain because it can use algorithmic consensus in lieu of game-theoretic consensus. The permissioned, blockchain-based, distributed exchange disclosed herein utilizes DConE as the platform for such algorithmic consensus. Depending on the use-case, an assortment of cryptographic practices may be used to address the nature of trust relationships. One example of such a distributed exchange discussed herein is an online gold exchange, termed AuX herein. It is to be noted, however, that the AuX gold exchange described herein is but one illustrative and exemplary implementation of the present distributed, secure fault and disaster-tolerant online exchange or marketplace and that other implementations will serve altogether different needs and functionalities, as those of skill in this art will recognize.

Indeed, the exchange described and shown herein will demonstrate the ease with which fault-tolerant, secure, high performance distributed applications can be built on top of DConE, of which AuX is but one representative use exemplar. One embodiment includes a DConE instances configured to accept exchange transaction proposals (e.g., bids or asks) from different, potentially geographically dispersed, server nodes, obtain consensus and collate the agreed-upon exchange transaction proposals into an ordered global sequence that is then made available to every server node. In one embodiment, the generated ordered global sequence respects the local order in which the transaction proposals were presented at any one of the server nodes. Identical application software running on different distributed server nodes processes this ordered global sequence of exchange transaction proposals independently, thus maintaining a replicated state machine. A significant feature of such an exchange or marketplace using DConE is that such an ordered global sequence of transaction proposals may continue to be generated as long as a consensus comprising the majority of server nodes are functioning at any given time.

FIG. 1 is a diagram of a distributed system implementing an exchange using a distributed coordination engine (DConE) according to one embodiment. According to one embodiment, a (preferably odd) plurality (e.g., 3, 5, 7 . . . ) of server nodes may be provided and coordinated, over a computer network, by a DConE 208. As shown in FIG. 1, one embodiment, for illustrative purposes only, may comprise three server nodes 102, 104, 106, each coupled to the DConE 108. According to one embodiment, the DConE 108 may be configured as an agent or instance at each node or cluster of nodes (which may be widely separated from one another), with the agents or instances coordinating with each other over a network such as a LAN or a WAN such as the Internet. However, for ease of reference and depiction, the DConE 108 is shown herein as being a separate, single entity. According to one embodiment, updates to the distributed ledger, initiated on one of the server nodes 102, 104 or 106, are propagated to the other server nodes in a consistent way by the DConE 108. In this manner, customers (such as buyers and sellers in the exchange, for example) can rely upon a ledger that is distributed and/or replicated across all server nodes coupled to the exchange. The replication methods disclosed herein for the distributed ledger provide an active-active model of high availability for a distributed system and allow load-balancing between the constituent server nodes of the exchange.

The DConE 108 may be configured to determine the global order of updates to the distributed ledger that records all transaction occurring in the exchange or marketplace. As all instances of the distributed ledger begin in the same state and as all server nodes are caused to apply updates in the same deterministic order (but not necessarily, according to embodiments, at the same time), the state of the multiple instances of the distributed ledger will remain consistent (or be brought into consistency) across nodes.

According to one embodiment, and as shown in FIG. 1, consistent updates to the distributed ledger of exchange transactions over multiple server nodes 102, 104, 106 may be carried out as follows. As shown at (1), one of the server nodes (in this case, server node 102) receives a bid or an ask 3 from a customer, in effect a proposal to buy or sell, respectfully, a specific amount of goods or services (in the case of the AuX described herein, gold), which will eventually cause an update to the distributed ledger. Similarly, in this example, server node 104 receives a bid or an ask 1 and server node 106 receives a bid or an ask 2 from customers of the exchange. According to one embodiment, rather than server node 102 immediately updating its ledger with the event (e.g., buy or sell request) encapsulated within the bid/ask 3, server node 104 immediately updating its state with the event encapsulated within received bid/ask 1 and server node 106 immediately updating its state with the event encapsulated within received bid/ask 2, and then propagating such updates to the other ones of the server nodes 102, 104, 106, these separate proposed exchange transactions are instead passed as proposals to the DConE 108, which sends these back to the server nodes 102, 104, 106 as corresponding agreements, after a majority of Acceptor nodes have reached agreement thereon (agreement being reached consensus by whatever consensus protocol is in place), as described herein.

That is, as shown in FIG. 1, responsive to the receipt of the bid/ask 3, server node 102 may issue a proposal Prop3 to the DConE 108 as shown at (2). Similarly, responsive to the receipt of bid/ask 1, server node 104 may issue a proposal Prop1 to the DConE 108 as shown at (2) and responsive to the receipt of bid/ask 2, server node 106 may issue a proposal Prop2 to the DConE 108 as also shown at (2). The DConE 108, according to one embodiment, then obtains agreements through consensus of a majority of Acceptor nodes, serializes the agreed-upon exchange transaction proposals and orders the proposals it receives as shown at (3) and feeds those proposals that have been agreed upon as a stream of ordered agreements (in this case, ordered as AGR3, AGR1 and AGR2) back to server nodes 102, 104, 106, as shown at (4). The server nodes 102, 104 and 106, upon receipt of the ordered sequence of agreements AGR3, AGR1 and AGR2, implement these agreements in that deterministic order, and correspondingly update the distributed or replicated ledger so that it is maintained consistent (and/or brought into consistency) across server nodes 102, 104, 106. In this manner, the state of the distributed or replicated ledger detailing the transactions on the exchange may be asynchronously updated, as suggested at (5), without loss of consistency across server nodes. These updates may then (but need not) be saved as journal transactions in respective local persistent storage 110, 112, 114 that may (but need not, as indicated by the dashed lines at 110, 112 and 114) be coupled or accessible to the server nodes 102, 104, 106. Then, notifications may be returned to the customers having submitted the bids or asks exchange transactions as appropriate.

Thus, according to one embodiment, server nodes 102, 104, 106 do not directly record customer's bids or asks in their copies of the replicated or distributed ledgers, but rather redirect them as proposals to the DConE 108 for agreement through consensus, serialization and ordering. Updates to the distributed and/or replicated ledgers stored at these server nodes are then issued from and by the DConE 108 as an ordered set of agreements. This guarantees that every server node 102, 104, 106 is updated when the exchange customer (e.g., a buyer or a seller) issues a bid or ask order that is eventually implemented, such that the updates will be transparently and consistently applied to all server nodes in the cluster. In this manner, an ordered and replicated ledger of all transactions may be maintained by each of the plurality of server nodes across the distributed system.

Therefore, a significant role of the DConE 108, according to one embodiment, is to process exchange transaction proposals received from the server nodes of the exchange and transform them into the global ordered sequence of agreements. The server nodes (which may be widely separated across geography and time zones) may then implement the transactions underlying the agreements from that ordered sequence and apply correspondingly ordered updates to the distributed or replicated ledger that records all transactions of the exchange. The agreements may, according to one embodiment, be ordered according to a Global Sequence Number (GSN), which may be configured, according to one embodiment, as a unique monotonically increasing number. The GSN may be otherwise configured, as those of skill in this art may recognize. The GSN may then be used to compare the progress of different server nodes in updating the distributed ledger and keeping the state of that ledger consistent across server nodes. For example, if server node 102 has just processed an agreement numbered GSN1, which is smaller than GSN2 just processed by server node 104, it follows that the instance of the ledger stored by server node 102 is in an earlier state than the instance of the ledger stored by server node 104.

According to one embodiment, customer read operations to the server node replicated state machines (e.g., requests to review past transactions, various reporting requests) do not require the DConE to reach consensus, only writes. It is to be noted that, according to one embodiment, the DConE 108 does not guarantee that the instances of the ledger at all server nodes 102, 104, 106 are identical at all server nodes at all times. Rather, the DConE 108 guarantees that each server node 102, 104, 106 will consistently learn about each exchange transaction in the same order as all other server nodes, and exchange customers will be able to see this information. In this manner, the DConE 108 is configured to generate a globally ordered sequence of events that is identically supplied to all server nodes 102, 104, 106 to cause sequentially ordered, predictable updates to the distributed and/or replicated ledger. In turn, this ensures that exchange events are consumed by each server node in the same order, causing each instance of the distributed and/or replicated ledgers to evolve in a predictable, tamper-proof and deterministic manner.

According to one embodiment, updates to journals stored in local persistent storage 110, 112, 114 may be carried out. However, the consistency of the ledgers stored by the server nodes 102, 104, 106 do not depend on such journal updates and each of the persistent storages (if present), according to one embodiment, is local to a server node and is not shared over the network with other server nodes. Similarly, maintaining the consistency of the distributed and/or replicated ledgers across server nodes 102, 104, 106 does not rely upon sharing other resources, such as memory or processor resources.

There is no preferred (master or otherwise distinguished) server node in the distributed system of the exchange, according to embodiments. Indeed, should one or more server node fails, or is taken offline for maintenance (or for any other reason), other active server nodes are available to serve customer bid or ask requests without any interruption in access. According to one embodiment, as soon as a previously down server node comes back online, it resynchronizes with the other server node servers automatically, as described below. Such synchronization may comprise learning of all agreed-upon exchange transaction proposals that were issued by the DConE 108 since the server node went down or was taken offline. Both the split-brain condition and data loss are eliminated, as the ledgers at all server nodes are always maintained in or brought to synchronism, thereby providing continuous hot backup by default. Both failover and recovery are immediate and automatic, which further eliminates need for manual intervention and the risk of administrator error. Moreover, none of the server nodes 102, 104, 106 is configured as a passive or standby server node. Indeed, according to one embodiment all server node servers in the distributed system are configured to support simultaneous exchange customer requests for access to or transactions within the exchange. Consequently, this enables the distributed system to be readily scaled to support additional server nodes, without sacrificing performance as workload increases. According to one embodiment, there are no passive standby servers in the present online exchange and the vulnerabilities and bottleneck of a single master coordinating server node are completely eliminated. Moreover, distributing customer transaction requests across multiple server nodes 102, 104, 106 (and/or others, not shown in FIG. 1) inherently distributes the processing load and traffic over all available server nodes. Active load balancing across server nodes 102, 104, 106 may also be carried out.

According to one embodiment, Ask/Bid proposals are submitted by the client, received by DConE, agreed upon, serialized and ordered into a global sequence to be consumed by the state machine, which then matches asks against bids. The state machine makes sure that the proposals are processed by the exchange applications across the customer nodes in an idempotent manner (proposals will produce the same result if executed once or multiple times) as DConE 108 might hand back a proposal multiple times. In one embodiment, DConE 108 guarantees FIFO order, in that, if a proposal p was submitted before q at a server node, then p appears before q in the global sequence.

Such a trading platform, therefore, may be configured to accept trades, either asks or bids. In one implementation, such ask and bid requests may be prioritized primarily on the competitiveness of the price and secondarily on the time of submission when faced with multiple trades with equal price. Other implementations may prioritize other characteristics. Each customer of the exchange may be identified by a unique ID.

According to one embodiment, the exchange application may be further configured to enforce some commonsense business rules, such as preventing buying and selling to oneself, or trades that exceed the customer's current account balance, may be implemented. For example, in one implementation, when a bid trade $X_b$ is received that is higher the current best ask price $X_a$, then much like a market order, it may be fulfilled immediately, but at price, in one implementation, of $(X_a+X_b)/2$, thereby favorably beating the expectations of both the buyer and the seller. Other order fulfillment methods may be used. According to one embodiment, once a trade is placed, it cannot be canceled. Transactions may be levied a small transaction fee, which may be for the benefit of the exchange platform provider. Also, the present implementation assumes that there is no market maker to provide liquidity.

DConE, according to one embodiment, enables a highly desirable fault-tolerant property; namely, that the distributed and/or replicated ledger of all exchange transactions remains consistent across all server nodes, even under node or communication link failures. According to one embodiment, fulfilled orders may be entered into the replicated/distributed ledger that stores, for each transaction, at least a unique transaction ID, a unique buyer ID, a unique seller ID, the trading price and the time of transaction. The ledger entries may, according to one embodiment, be formatted in XML, although other formats are also possible.

The exchange of the present distributed system is said to be in a quiescent state if all submitted bid and ask proposals have been handled, there are no new bid or ask proposals, and every server node of the distributed system is aware of all the submitted proposals. One way to ensure that the data across all nodes is identical under failures in a quiescent state is by querying and examining data from each server node using a browser. Towards that end, one embodiment may utilize, for example, a Representational State Transfer (REST) API, to enable examination of the ledgers from different nodes using a browser. REST is an architectural style that defines a set of constraints and properties based on hypertext transfer protocol (HTTP). Web Services that conform to the REST architectural style, or RESTful web services, provide interoperability between computer systems on the Internet. REST-compliant web services allow the requesting systems to access and manipulate textual representations of web resources by using a uniform and predefined set of stateless operations. The REST API enables the replicated and maintained-consistent ledger from different node to be examined from a browser. A REST end point may be provided to which a browser may be pointed to view the trading history of a customer. Other APIs may be used within the present context.

Architecture of the Exchange

Figure 2:
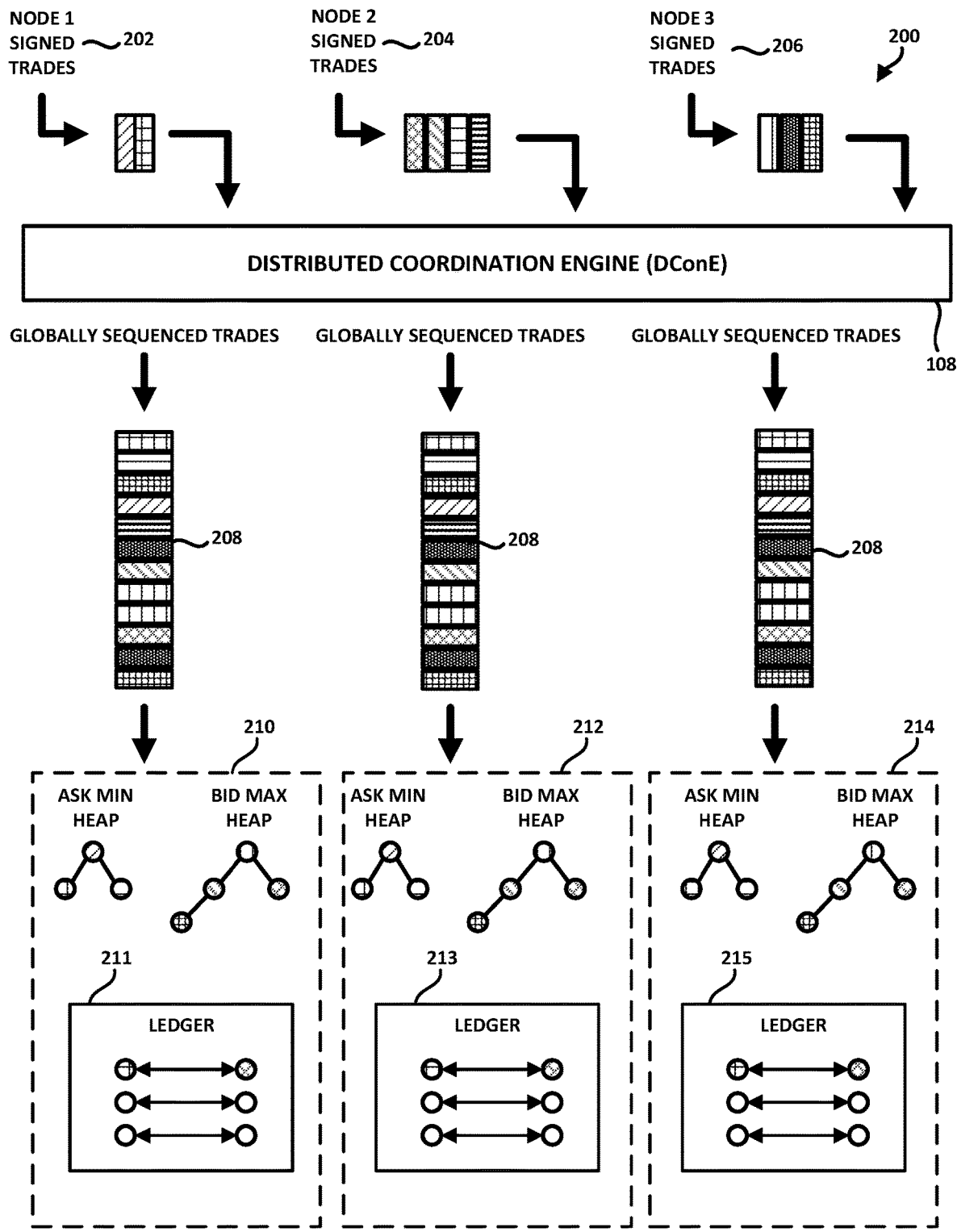
FIG. 2 is a block diagram illustrating aspects of an exchange according to one embodiment.

FIG. 2 shows aspects of the architecture of an exchange according to one embodiment, with three node instances. According to one embodiment, the exchange 200 may be configured to settle its trades by dequeuing events (bids and asks in this case) from the globally-sequenced trades generated and sent by DConE and to use the dequeued trades in a settling application process called, for illustrative purposes only, Settle Ask (p, q).

In one embodiment, the exchange 200 assumes that none of the participants are malicious; that is, the exchange assumes that the parties utilizing the exchange are trusted. In one embodiment, therefore, the exchange 200 may be configured around the so-called non-Byzantine model, as may be the DConE 108 itself. Exchange customers register with the exchange by providing suitable identifying information as appropriate and deposit fiat money, cryptocurrency, gold or other digital indicia of value and receive unique buyer and/or seller IDs, as appropriate. For example, providing a proof of ownership of gold/cash may vary depending on the situation, location and jurisdiction. Indeed, the interface between the physical world and the digital, which entails customer registration, depositing gold/cash into a new account, etc. is not addressed herein further.

As shown in FIG. 2, exchange customers may issue secure, digitally-signed trades using, for example, their public key in a Pretty Good Privacy (PGP) cryptography protocol. The trades may originate from server nodes on a network, as shown at Node 1 referenced at 202, Node 2 referenced at 204 and node 3 referenced at 206. That is, exchange customers may issue a bid or ask to one of the server nodes and the bid or ask may be encapsulated in a proposal together with other information (identity of the buyer or seller, timestamp, etc.) and forwarded to the DConE 108. In the example shown in FIG. 2, Node 1 202 issues two proposals, each of which may be a time-stamped bid or an ask for a predetermined amount of a thing of value or services. In the exemplary AuX implementation described herein, the bid or ask would be for a specified amount of gold. In this example, Node 2 issues four such proposals at 202 and Node 3 issues three proposals at 206 to the exchange 200. Functionally, the exchange customer may have logged onto the exchange application, and issued a buy (a bid) or sell (an ask) order. This bid or ask order may be encrypted (both the buy or sell payload and the communication channel) and securely transmitted to the DConE 108. The DConE 108 may be configured to receive proposals from all participating server nodes, achieve consensus on all exchange transaction proposals from a majority of the server nodes in their Acceptor roles and to serialize the agreed-upon exchange transaction proposals and order them, in one embodiment, according to their time-stamp. In another embodiment, the agreed-upon exchange transaction proposals may be ordered respecting the order in which they were received at their server node; that is, while respecting their local sequence number. The serialized and ordered proposals, in this manner, become an ordered, global sequence of proposals, as shown at 208.

As shown in FIG. 2, the global sequence of proposals 208, each including at least some of the same proposals in the same order, may be encrypted, and securely sent to all server nodes in the distributed system where sell orders and can matched with buy orders and vice versa. Each server node stores at least a full record of all buy and sell activities of all registered exchange customers—e.g., an instance of the replicated/distributed ledger. Indeed, according to one embodiment, a ledger 211, 213, 215 may be maintained and stored in each of the server nodes 210, 212, 214, respectively. The ledgers 211, 213, 215 contain at least a complete history of trades including at least a unique identifier of the buyer, a unique identifier of the seller, the amount, thing or service purchased and a time-stamp of the transaction, to name but a few of the items stored thereby. The replicated/distributed ledgers may be stored in persistent storages at, or accessible to, each of the server nodes. As each of the global sequences of proposals 208 sent to the server nodes 210,212, 214 are identically-ordered (though not necessarily containing the same number of ordered proposals) and the constituent bids/asks in these proposals are consumed by the exchange application at each of the plurality of server nodes in the same order and as bids and matched with asks in the same manner in each of the server nodes, the ledgers 211, 213, 215 may be updated in a consistent manner across server nodes and are assured to be identical or to become identical over time. Indeed, even though each of the ledgers 211, 213, 215 may not be identical at an instantaneous point in time, they are assured to become identical over time, as the order and manner in which changes are applied thereto are identical, changing state in a lockstep, predictable manner.

As shown in FIG. 2, the server nodes receive the proposals of the global sequence of proposals and separate them into ask proposals and bid proposals. According to one embodiment, the ask proposals are fed into an Ask min heap and the bid proposals are fed to a Bid max heap. Herein, a heap is defined as a specialized tree-based data structure that satisfies the heap property: if P is a parent node of C, then the key (the value) of P is less than or equal to the key of C for a min heap or, for a max heap, the key of P is greater or equal to the key of C. The node at the "top" of the heap (the node of the min heap structure that has no parent) is called the root node. For purposes of illustration, let us assume that the exchange 200 is a gold exchange and that a customer C places a trade T to sell q units of gold at price p per unit. (a similar algorithm may be implemented for buying/bidding.) According to one embodiment, a process for settling the ask for q units of gold at price p, or Settle Ask (p, q) may be configured as follows. The idempotence property requires that when the DConE 108 hands down a proposal containing T, a check is made to determine whether the trade T has previously been processed. If, so, the trade is not repeated. If the trade T has not previously been processed, the trade may proceed. Suitable business logic and/or commonsense may be applied to ensure, for example, that the C's account with the exchange 108, in fact, has at least the amount of gold that C wants to sell—assuming that sellers are not aggregated. Other business logic and/or rules may be applied, such as ensuring that exchange customer C does not have an outstanding Bid on the exchange with a price greater than p. If the proposal containing T fails any of these threshold tests, the trade T should not proceed or may be delayed pending further verifications, surety or collateral.

To fulfill the trade T, according to one embodiment, the trade T may be inserted into the ask min heap ($A_{min}$). An attempt is then made to match the roots of both heaps with one another. Note that in an efficient marketplace, the best ask and best bid are likely to be very close to each other if not equal most of the time. Indeed, if the best ask price $p_{ask}$ as indicated as indicated by the root node of $A_{min}$ is less or equal to the best bid price $p_{bid}$ as indicated by the root node of bid max heap $B_{max}$, the root nodes of both $A_{min}$ and $B_{max}$ are deleted, and this pair of trades may be written to the replicated/distributed ledger along with a settlement price of, in this implementation, $(p_{ask}+p_{bid})/2$ along a time and date stamp of the current time and date. A similar Settle Bid (p, q) may be devised, as those of skill in this art may recognize. Other methods of matching available buyers with available sellers may be developed within the context of the present disclosure. In this manner, the min and max heaps $A_{min}$ and $B_{max}$ evolve over time and the ledgers 211, 213 and 215 grow over time, each recording the transactions in the same order. As the replicated ledger comprising ledgers 211, 213 and 215 are maintained to be identical, malicious attempts to alter any one constituent instance of the replicated ledger would not be successful, as the other ledger instances would no longer be in agreement and as there is no mechanism for propagating changes to other instances of the ledger or for changing the ledgers other than through the globally sequenced (by GSN) trades shown at 208.

Preserving the Local Sequence

It is sometimes a causal ordering requirement, for a given server node, to implement a first-come-first-served or FIFO, process in handling of the exchange transaction proposals based on their time of arrival and make sure that they are output in the same order. As noted above, there is no solution for such a policy if related proposals are submitted to two different nodes. When submitted to the same node, one embodiment satisfies this FIFO constraint through preprocessing and post-processing steps. Indeed, according to an embodiment, when exchange transaction proposals $P_0$ and $P_t$ are submitted to the same node, it is shown that this local sequence preserving constraint can be satisfied by adding preprocessing and post-processing steps. Preprocessing steps according to one embodiment may include assigning a local sequence number (LSN) upon the exchange transaction proposal's arrival at the DConE 108. LSNs need only be unique, they need not be continuous, consecutive or monotonic. In fact, the LSNs need not be numbers—they may be or incorporate strings. The only requirement for the LSNs is uniqueness. According to one embodiment, the exchange transaction proposal number P should be configured such that two values may be derived therefrom:

1. The identity of the server node N at which the exchange transaction proposal P was received, and
2. For all exchange proposals except the first, the LSN of the exchange transaction proposal that arrived at server node N just prior to the arrival of the exchange transaction proposal P. This prior exchange transaction proposal herein is called the predecessor of P.

In one embodiment, the LSN numbering scheme at server node N may simply be $N_1, N_2, N_3, \ldots$. Given $N_i$, the server node N at which it arrived may be derived from $N_i$ and for all i>1, the exchange transaction proposal that was received at server node N before $N_i$ (the predecessor of $P_i$) is $N_{(i-1)}$.

If, for some reason, sequential numbering cannot be generated, but an access to a source of monotonically increasing numbers is available, then the LSN numbering may be configured as two tuples: if $N_j$ appears right after $N_i$ and $j \neq (i+1)$, then LSN is simply $<N_j, (j-i)>$. From $<N_j, (j-i)>$, we can determine again that the exchange transaction proposal arrived at node N, and the predecessor of $N_j$ can be obtained by subtracting to the second tuple (j−i) from the subscript j to conclude that it is $N_i$. Other LSN numbering schemes may be devised.

According to one embodiment, post-processing steps may be performed to ensure that the local sequence is respected in the globally-ordered sequence of exchange transaction proposals generated by DConE. In one embodiment, after exchange transaction proposals undergo the consensus process and as an output sequence that is a mix of exchange transaction proposals originating from all exchange nodes is generated by DConE, each of the exchange transaction proposals received from all server nodes may be associated with a preliminary global sequence number, called GSN' herein. The GSN' is an ordered sequence of numbers (or other unique identifiers) associated with agreed-upon exchange transaction proposals (i.e., exchange transaction proposals on which consensus has been reached through DConE). The order in which the constituent exchange transaction proposals originating from a given server node appear in the GSN' may not (but could) respect the LSN from that given node. When it is desired that the LSN for each server node be respected in the GSN' (as it would be in implementations such as the present exchange or marketplace), post-processing steps according to one embodiment may be performed to enforce that local ordering of exchange transaction proposals for each server node.

According to one embodiment, post-processing modifies GSN' to produce another global sequence number, GSN, as shown below. These post-processing steps insure that GSN has the following desirable property: if an exchange transaction proposal $P_i$ appeared before an exchange transaction proposal Pj in the input queue to DConE at node N, then the exchange transaction proposal $P_i$ will appear before the exchange transaction proposal $P_j$ in GSN.

To ensure that the LSN for each node is respected in the GSN, the following may be carried out. If there are n nodes participating in DConE, n min heaps, $H_1, H_2, \ldots, H_n$ may be created, one min heap corresponding to each of the server nodes of the distributed system comprising the exchange. According to one embodiment, post-processing may also include creating n variables processedProposalNo$_i$, where $1 \leq i \leq n$, one such variable for each server node to keep track of the most recent exchange transaction proposal number that was output. Initially, these variables are undefined.

According to one embodiment, exchange proposals P from the preliminary global sequence number GSN' may be processed as follows. Indeed, an exchange proposal $P_i$ submitted by server node x may be processed as follows:
  a. Insert exchange proposal $P_i$ into the min heap $H_x$ for server node x. The root of $H_x$ is called $P_{root}$;
  b. While (processedProposalNo$_x$==predecessor of $P_{root}$) //Boolean condition (undefined==$P_1$) evaluates to true by definition
    i. Delete $P_{root}$ from $H_x$
    ii. Append $P_{root}$ to GSN, and
    iii. Write $P_{root}$ to the variable processedProposalNo$_x$ Proposal P whose predecessor has not appeared on GSN, goes into a holding pattern. This is done by dequeuing P from GSN' and enqueuing it into a min heap (also known as a Priority Queue) that corresponds to the node where P was submitted. The condition Is my predecessor on GSN? is checked by consulting the variable processedProposalNo. Furthermore, this condition is checked and proposals are output to GSN repeatedly until either the heap becomes empty or the condition is no longer true.

Figure 3:
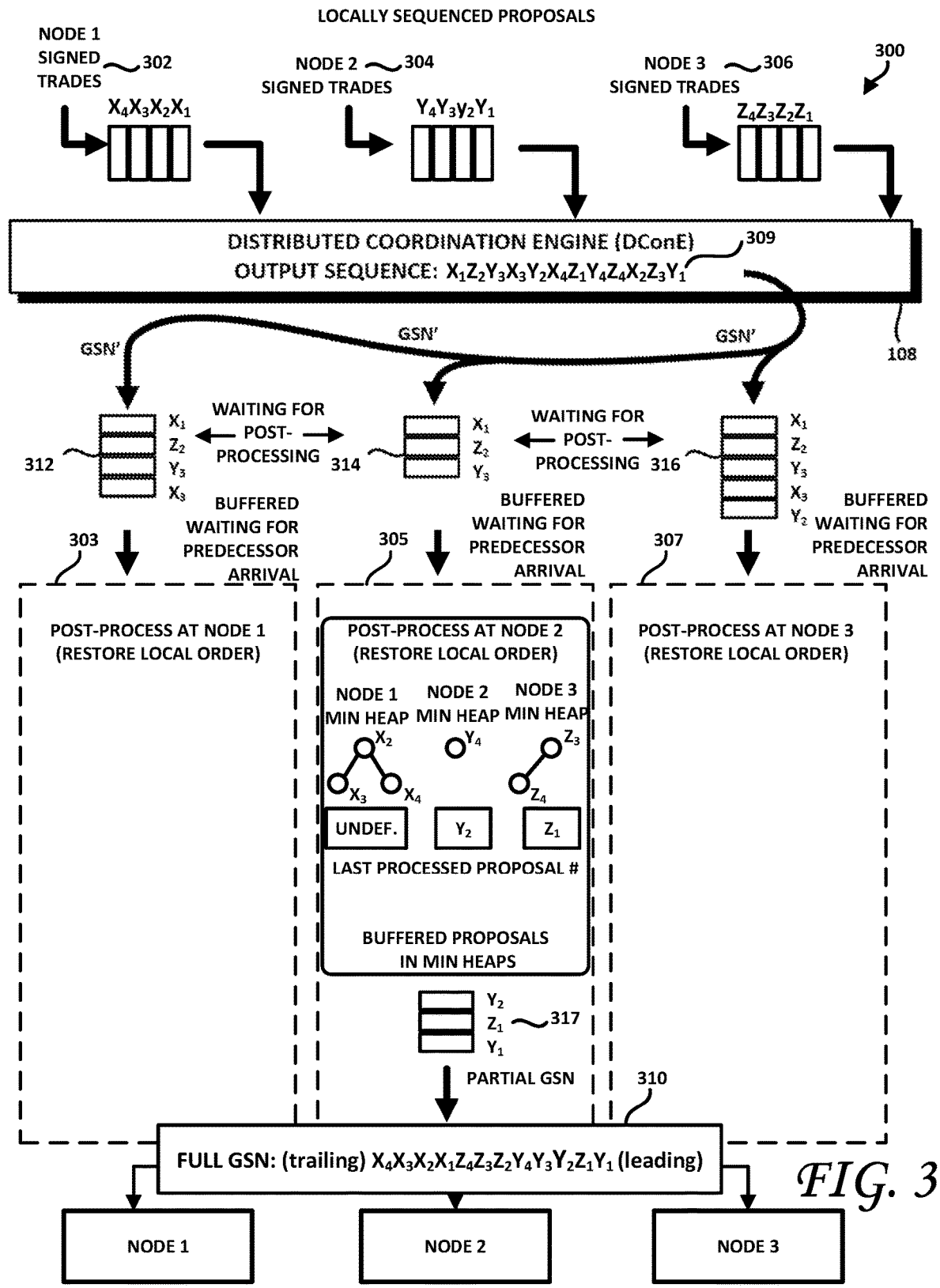
FIG. 3 is a block diagram illustrating aspects of a computer-implemented method of respecting local sequence numbers when generating a globally-ordered sequence of exchange transaction proposals, according to one embodiment.

FIG. 3 illustrates aspects of a computer-implemented method 300 of processing the sequence of agreed-upon exchange transaction proposals generated by DConE to respect the local ordering of the exchange transaction proposals as they were sent to the DConE 108 by the respective originating nodes in the exchange. In some applications, causing the GSN to respect local ordering is not necessary. In other applications, however, fairness considerations dictate strictly respecting the local ordering of exchange transaction proposals. One embodiment, therefore, may be configured to utilize GSN output by the DConE 108 without any re-ordering to respect the local sequences. Another embodiment may be configured such that the GSN output of the DConE 108 is re-ordered as necessary such that the local ordering of the exchange transaction proposals in each node is respected in the sequence of agreements generated by DConE 108. For example, a command line "switch" or other functionality may be provided, to selectively enable or disable the re-ordering of the sequence of agreements output from the DConE to respect (e.g., conform to) the ordering of the corresponding exchange transaction proposals in each of the nodes that is contributing exchange transaction proposals to the sequence of agreements output by DConE 108.

As shown, three server nodes; namely, Node 1, Node 2 and Node 3 are coupled to the exchange and send exchange transaction proposals to the DConE 108. Indeed, server node 1 (Node 1) sends exchange transaction proposals $X_4, X_3, X_2$ and $X_1$ as shown at 302, server node 2 (Node 2) sends exchange transaction proposals $Y_4, Y_3, Y_2$ and $Y_1$ as shown at 304 and server node 3 (Node 3) sends exchange transaction proposals $Z_4, Z_3, Z_2$ and $Z_1$ as shown at 306 to DConE 108. Lower indexes indicate earlier arrival time. These proposals are received by DConE 108 which, through a consensus protocol, achieves agreement on the received exchange transaction proposals and outputs the (exemplary) ordered preliminary global sequence GSN', consisting of an ordered sequence of agreed-upon exchange transaction proposals (now simply called agreements) $X_1Z_2Y_3X_3Y_2X_4Z_1Y_4Z_4X_2Z_3Y_1$, which sequence includes the agreed-upon exchange transaction proposals from each of Nodes 1, 2 and 3.

In FIG. 3, therefore, the locally-ordered signed exchange transaction proposals (or trades as shown in FIG. 3) 302, 304, 306 are received in the DConE 108 from Nodes 1, 2 and 3, respectively. The preliminary GSN', however, may not (but conceivably could) respect the local ordering of the proposals originating from each of the nodes. For example, in the GSN' (trailing)$X_1Z_2Y_3X_3Y_2X_4Z_1Y_4Z_4X_2Z_3Y_1$(leading), agreement $Z_3$ appears before $Z_1$, which does not respect the order in which the Z proposals were submitted to the DConE 108 by Node 3; namely $Z_4, Z_3, Z_2$ and $Z_1$. Therefore, according to one embodiment, the constituent agreements of GSN' may then be re-ordered into the GSN shown at 310. The GSN 310 is configured such that the constituent agreements thereof are ordered to respect the local order of the corresponding exchange transaction proposals in each node. The post-processing to effectuate this re-ordering between the GSN' 309 and the GSN 310 is shown at 305, with identical post-processing occurring at 303 and 307.

FIG. 3 is a snapshot in time of the post-processing steps that take the preliminary GSN' 309 and output the re-ordered GSN 310. As shown, the preliminary GSN' 309 is output identically to all three Nodes 1, 2 and 3 for post-processing, although not necessarily at the same time. As the re-ordering process is deterministic, the same inputs will always yield the same outputs, thereby guaranteeing that the same GSN 310 will be identically output to Node 1, Node 2 and Node 3, each of which will then execute the underlying exchange transactions and update the replicated ledger in the same order. The snapshot in time illustrated in FIG. 3 is taken, for illustrative purposes, such that Node 1 is currently processing the $Y_2X_4Z_1Y_4Z_4X_2Z_3Y_1$ portion of the GSN' which, therefore, leaves $X_1Z_2Y_3X_3$ waiting for post-processing at 312. Similarly, Node 2 is currently processing the $X_3Y_2X_4Z_1Y_4Z_4X_2Z_3Y_1$ portion of the GSN' which, therefore, leaves $X_1Z_2Y_3$ waiting for post-processing at 314. Lastly, node 3 is currently processing only the $X_4Z_1Y_4Z_4X_2Z_3Y_1$ portion of the GSN' which, therefore, leaves the comparatively greater portion of the GSN' $X_1Z_2Y_3X_3Y_2$ waiting for post-processing at 316. Significantly, although Node 1, Node 2 and Node 3 may process the agreements in the GSN' at different rates and may not all be processing the same agreement at the same time, the nodes are all fed the same agreements from the GSN' in the same order and processing them in the same manner to yield the same GSN. This ensures that the underlying transactions are executed in the same order at each node and that each node updates its copy of the distributed/replicated ledger in the same order. This means that, over time, the distributed/replicated ledger of completed transactions is (or will become) identical across nodes.

FIG. 3 shows the post-processing at Node 2, with the understanding that Nodes 1 and 3 use identical post-processing steps on the constituent agreements of the preliminary GSN' 309. As shown, a min heap is provided for each node. In Node 2, therefore, a min heap is provided for Node 1, another min heap is provided for Node 2 and yet another min heap is provided in Node 2 for Node 3, one min heap for each of the nodes supplying proposals to the DConE 108. These min heaps are respectively populated with the agreements from the GSN' 309 corresponding to their node of origin. As noted above, Node 2 is currently processing the $X_3Y_2X_4Z_1Y_4Z_4X_2Z_3Y_1$ portion of the GSN' which, therefore, leaves $X_1Z_2Y_3$ waiting for post-processing at 314. Agreement $Y_1$ is the first agreement to post-processed in Node 2. Since $Y_1$ has no predecessors, it is passed directly to the GSN, as shown at the leading end of GSN 310 in FIG. 3. Next, $Z_3$ is processed. Since $Z_2$, the predecessor of $Z_3$ has not been processed, $Z_3$ is inserted into the heap that corresponds to Node 3. It is noted that $Z_1$ is present in the portion $X_3Y_2X_4Z_1Y_4Z_4X_2Z_3Y_1$ of the GSN' currently being post-processed at Node 2. Agreement $Z_1$, therefore, having the lowest index value of all Z agreements, is moved directly to the GSN, to the left of (after) $Y_1$. Z1 is, therefore, moved into the last processed proposal # position and agreements Z3 and Z4 are still stuck in the min heap waiting for the arrival of their predecessors: Z3 waiting for Z2, and Z4 for Z3 to make the way. The min heap for Node 3 would be as shown, with Z3 at the root position. Next encountered in the portion of the GSN' currently being post-processed is $X_2$. Since $X_1$ is not present in the portion $X_3Y_2X_4Z_1Y_4Z_4X_2Z_3Y_1$ of the GSN' currently being processed by Node 2, none of the X agreements can be output to the GSN at this time and the last processed proposal # for the Node 1 agreements is, therefore, set to "undefined". Indeed, $X_1$ is shown in FIG. 3 as waiting for post-processing, as shown at 314. Therefore, $X_2$, $X_3$ and $X_4$, which are indeed present in the portion $X_3Y_2X_4Z_1Y_4Z_4X_2Z_3Y_1$ of the GSN' currently being processed by Node 2, are used to populate Node 2's min heap for Node 1, with $X_2$ in the root position. Agreement $Y_4$ is then processed. Since $Y_2$ is present in the portion $X_3Y_2X_4Z_1Y_4Z_4X_2Z_3Y_1$ of the GSN' currently being processed by Node 2 and is has the next-lowest index of the Y agreements, $Y_2$ is output to the GSN and recorded as the last processed proposal # for the Node 2 (processedProposalNo$_2$ in the above-listed process) and $Y_4$ is moved to the root of the Node 2 min heap. Thus far, this post-processing has output a partial GSN 317 of $Y_2Z_1Y_1$, which constitutes the leading end of the GSN shown at 310. The other constituent agreements of the GSN' are processed in the same manner to yield the GSN 310.

Indeed, $Y_3$ would then be processed from the agreements waiting to be post-processed at 314. Since agreement $Y_2$, $Y_3$'s predecessor, was the last processed proposal #, $Y_3$ can be output directly to the GSN 310, to the left of $Y_2$, whereupon $Y_3$ can be entered as the last processed proposal #, thereby allowing $Y_4$ to come into the GSN 310 next. Similarly, when $Z_2$ is post-processed, it is determined to have the lowest index value not yet processed, thereby enabling $Z_2$ to be moved directly to the GSN 310, followed by $Z_3$ and $Z_4$ from the Node 3 min heap. Finally, $X^1$ is post-processed, determined to have no predecessors, and is sent directly to the GSN 310 after $Z_4$, followed by the remaining X agreements in the Node 1 min heap, from smallest index value to largest. Therefore, the root of the Node 1 min heap; namely $X_2$, is moved to the GSN 310, identified as the last processed proposal # for Node 1, whereupon agreement $X_3$ takes its position at the root position. $X_3$ is then output to the GSN 310, assigned as the last processed proposal # and $X_4$ is moved to the root position of the Node 1 min heap and moved to the GSN 310. This process results in the GSN 310 in which the order of the agreements $X_4X_3X_2X_1Z_4Z_3Z_2Y_4Y_3Y_2Z_1Y_1$ respects the local ordering of the corresponding exchange transaction proposals generated at each node. Indeed, note that, unlike the GSN' 309, in the GSN 310, $Z_3$ no longer appears in the sequence before $Z_1$, which respects the local ordering of the corresponding exchange transaction proposals submitted to the DConE 108.

Cryptographic Security

Figure 4:
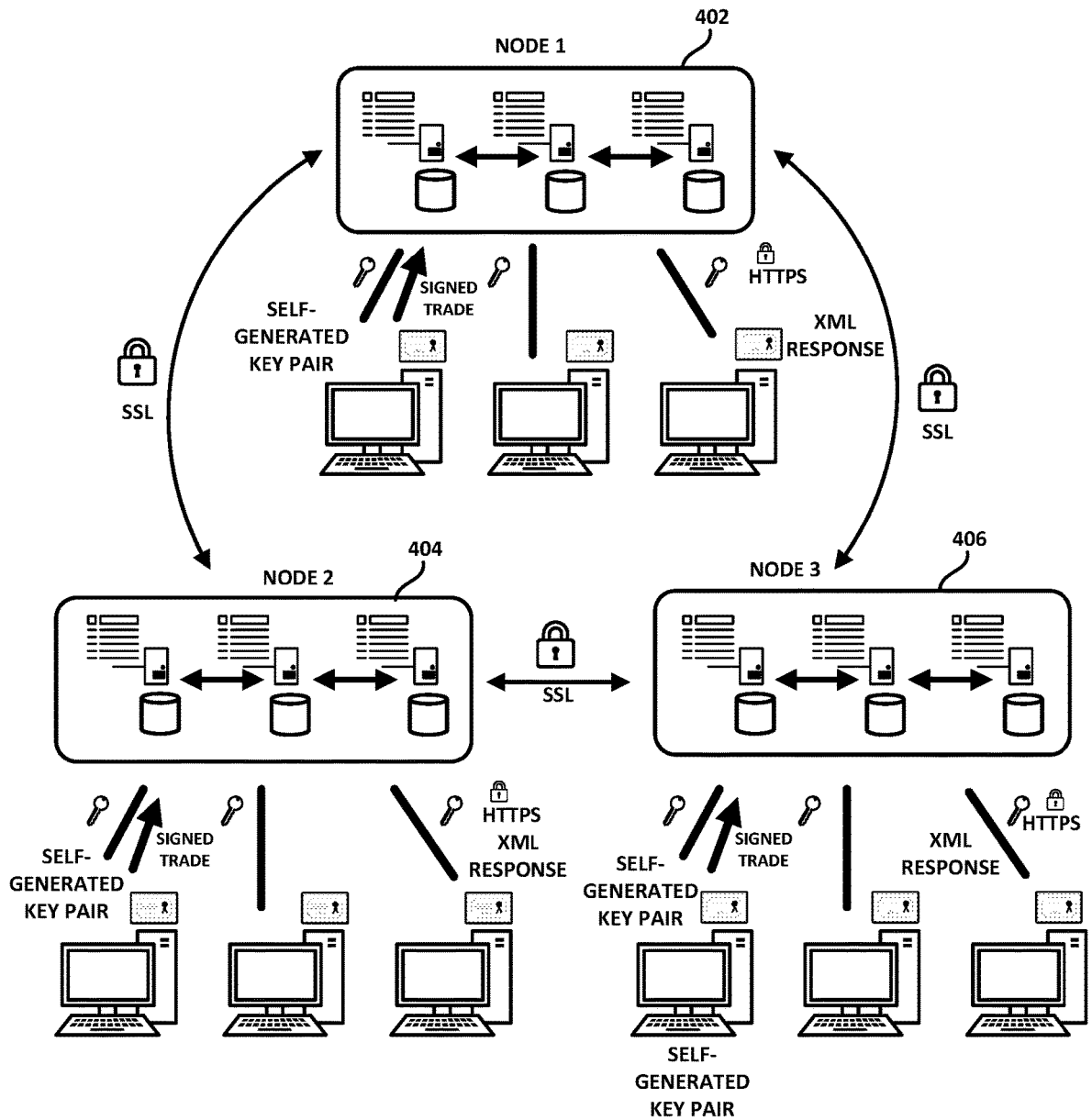
FIG. 4 is a diagram illustrating security and cryptographic aspects of an exchange according to one embodiment.

One embodiment of the exchange disclosed herein assumes that none of the participants are malicious. Indeed, one embodiment is built around the so-called non-Byzantine model, as may be the DConE 108. FIG. 4 shows an exemplary exchange comprising a plurality of compute nodes, each comprising one or more server nodes and illustrates the security and privacy features of an exchange according to one embodiment. The block diagram of FIG. 4 shows the various places where cryptography and other security protocols may be employed to achieve end-to-end security. As shown, each of the nodes; namely Node 1 402, Node 2 404 and Node 3 406, may comprise a plurality of server nodes and may each comprise an instance of DConE, as shown and described relative to FIGS. 1, 2 and 3. Each of the nodes 402, 404, 406 may be coupled to a network including, for example, the Internet. Instances of DConE may securely communicate between compute nodes to achieve consensus (agreements on exchange transaction proposals) via secure communication channels. In one embodiment, inter-node communications may utilize the secure socket link (SSL) protocol. Bids and asks, according to one embodiment, may be signed using, in one implementation, the customer's Pretty Good Privacy (PGP) private key and verified, at the DConE end, with the customer's PGP public key. Other encryption protocols may be utilized. Transmissions to the exchange server and responses, trade confirmations and other information may be communicated back to the customer computing device as, for example, XML messages via HTTP Secure (HTTPS or HTTP over SSL).

Aspects of customer anonymity, if anonymity is in fact desired, may be a function of the regulatory environment in which the exchange operates. In one embodiment, a customer C can transact anonymously by generating a public/private key pair at the time registration and use the public key part of the pair to associate with an account owned by C. The exchange may achieve non-repudiation by requiring that the customer sign each trade using the private key associated with the account where the trade originates. Trades may be signed using the RSA algorithm with a configurable number of bits such as 512 bits, in one embodiment.

Security of Trades

As each trade placed from an account by a customer C must be digitally signed using the customer's private key $C_{priv}$ associated with that account, and since only C is supposed to know $C_{priv}$, others cannot place fraudulent trades masquerading as customer C. According to one embodiment, the same digital signature mechanism may also bind C to the transaction so that C cannot disavow placing a trade at a later point. Once trades are fulfilled, they are written to a replicated ledger, with each node 402, 406, 408 maintaining at least one copy of the ledger. According to one embodiment, the exchange may continue to make progress (e.g., match asks and bids, process transactions and update the ledgers) upon the failure of at most f simultaneous nodes in an implementation involving 2f+1 nodes. For instance, in an implementation involving eleven nodes (f=5), even if five nodes fail at the same time, the exchange would continue to make progress. As the exchange maintains customer accounts and the ledger, and since the model is non-Byzantine, the accounts and the replicated ledgers would remain tamper-proof throughout. According to one embodiment, the exchange may also be configured according to a Byzantine model, in which case the exchange may continue to make progress (e.g., match asks and bids, process transactions and update the ledgers) upon the failure of at most f simultaneous nodes in an implementation involving 3f+1 nodes. For instance, in a Byzantine implementation involving sixteen nodes (f=5), even if five nodes fail at the same time, the exchange would continue to make progress.

According to one embodiment, the exchange database may comprise various data structures, customer histories, and the replicated ledger itself. To enable scale, the exchange database may be portioned into a plurality of shards. Some of the data, such as the ledger, for example, may be present in each of the plurality of shards.

The distributed system described and shown herein possesses all of the characteristics associated with blockchain or distributed ledger technology-based distributed systems. These include consensus, validity, uniqueness, immutability and non-repudiation. Consensus is achieved by the distributed coordination engine 108—DConE—described and shown herein. Validity is achieved in the present distributed exchange system, as the present exchange is configured to check validity of trades by, for example, ensuring that the account placing it has sufficient resources available (cash or gold) to place a trade. Other measures to ensure the validity of both customers and their trades may be established. The uniqueness characteristic is obtained by the nature of permissioned blockchains and the deterministic, ordered nature of the execution of exchange transactions in AuX. This deterministic, ordered execution of exchange transactions and the likewise deterministic and ordered nature of changes made of the distributed ledger recording these exchange transactions results in the creation of one and only one ledger, even though the single ledger may be distributed or replicated over the distributed system. The immutability characteristic is obtained as the ledger is collectively held by the distributed system and no one copy can be changed. Moreover, since all nodes are honest (non-Byzantine), they are assumed to follow the rules of the exchange and the ledger is identical across all nodes and is maintained in that state. The non-repudiation characteristic is obtained by virtue of the above-described private keys for signing trades, and potentially for other purposes as well, such as vouching account balances, etc.

Figure 5:
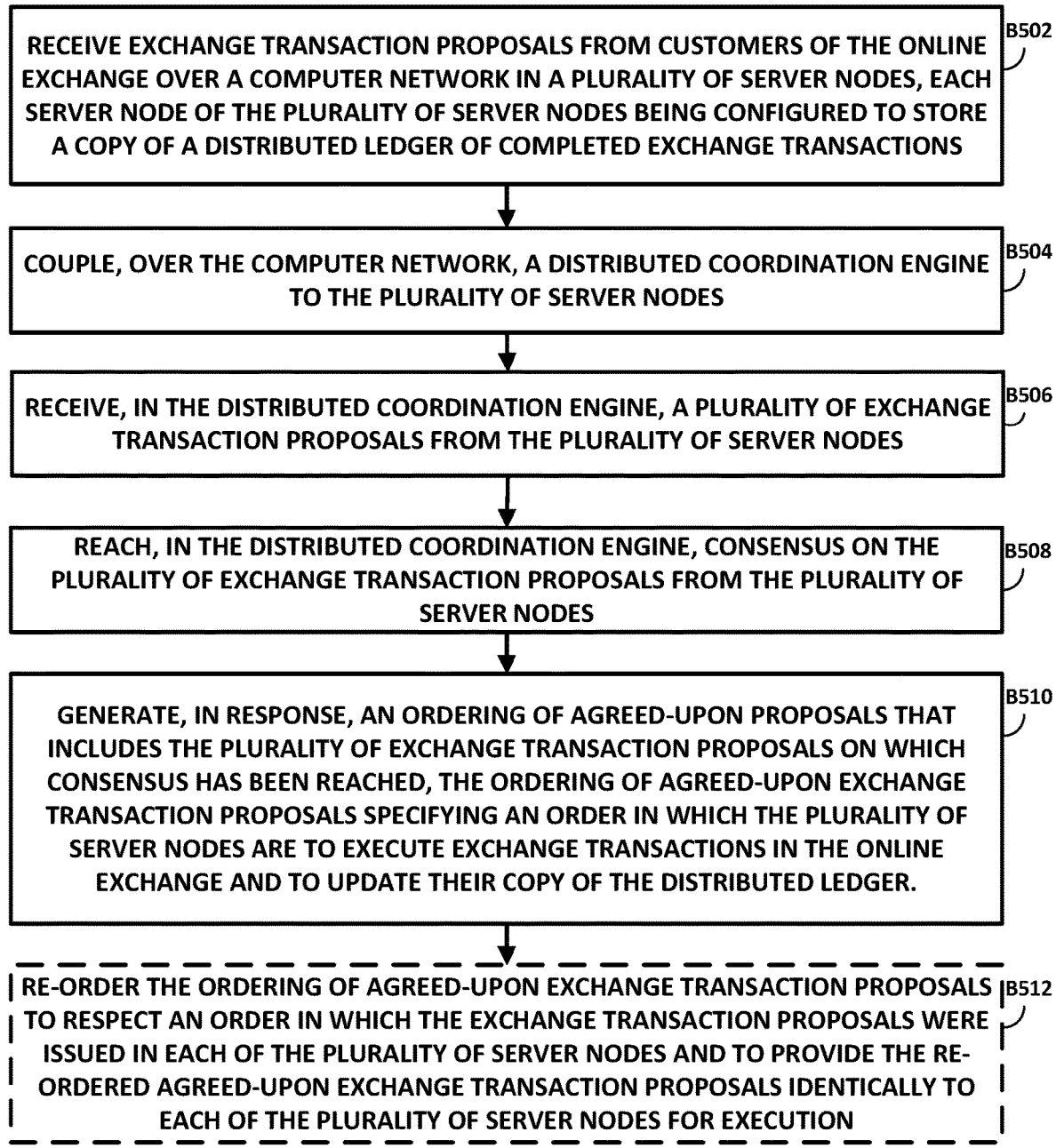
FIG. 5 is a flowchart of a computer-implemented method according to one embodiment.

FIG. 5 is a flowchart of a computer-implemented method according to one embodiment. More particularly, FIG. 5 is a flowchart of a computer-implemented method of implementing an online exchange in a distributed system and of implementing a blockchain distributed ledger in such an online exchange. As shown at B502, the method may comprise receiving exchange transaction proposals from customers of the online exchange over a computer network in a plurality of server nodes. Each server node of the plurality of server nodes may be configured to store a copy of a replicated ledger of completed exchange transactions. As shown at B504, a distributed coordination engine may be coupled, over the computer network, to the plurality of server nodes. The distributed coordination engine may receive a plurality of locally ordered exchange transaction proposals from the plurality of server nodes, as shown at B506. Block B508 calls for achieving, in the distributed coordination engine, consensus on the plurality of locally ordered exchange transaction proposals from the plurality of server nodes. Then, in B510, the computer-implemented method may then cause the generation, in response, of an ordering of agreed-upon exchange transaction proposals that includes the plurality of exchange transaction proposals on which consensus has been reached. As shown, the ordering of agreed-upon exchange transaction proposals may specify an order in which the plurality of server nodes are to execute exchange transactions in the online exchange and to update their copy of the replicated ledger. Optional block B512 calls for re-ordering the ordering of agreed-upon exchange transaction proposals to respect an order in which the exchange transaction proposals were received issued in each of the plurality of server nodes and for providing the re-ordered agreed-upon of the exchange transaction proposals in the plurality of locally ordered exchange transaction proposals and for providing the re-ordered agreed-upon exchange transaction proposals identically to each of the plurality of server nodes for execution.

1. In other embodiments, each of the exchange transaction proposals received by the plurality of server nodes may be digitally signed by a customer of the online exchange. Each of the exchange transaction proposals received by the plurality of server nodes may be encrypted. In one embodiment, the distributed coordination engine may comprise a plurality of distributed coordination engine instances that communicate amongst themselves over secure communication channels. The distributed coordination engine may be further configured to re-order the ordering of agreed-upon exchange transaction proposals to respect an order in which the exchange transaction proposals were issued in each of the plurality of server nodes and to provide the re-ordered agreed-upon exchange transaction proposals identically to each of the plurality of server nodes for execution. The distributed coordination engine may be further configured to assign a unique local sequence number (LSN) to each of the exchange transaction proposals received from each of the plurality of server nodes. The LSN, in turn, may be configured as two tuples $<N_j, N_i>$, where N identifies a unique server node of the plurality of server nodes, $N_i$ and $N_j$ each identify unique exchange transaction proposals and where $N_j$ arrives right after $N_i$. The LSN may be otherwise configured. For example, the LSN may be numbered sequentially. In one embodiment, the distributed coordination engine may be further configured to re-order the ordering of agreed-upon exchange transaction proposals to respect an order of the exchange transaction proposals in each of the plurality of exchange transaction proposals by buffering the agreed-upon exchange transaction proposals in respective min heaps, one for each of the plurality of server nodes, and by iteratively identifying respective last processed agreed-upon proposal numbers as the respective roots of the respective min heaps.

Figure 6:
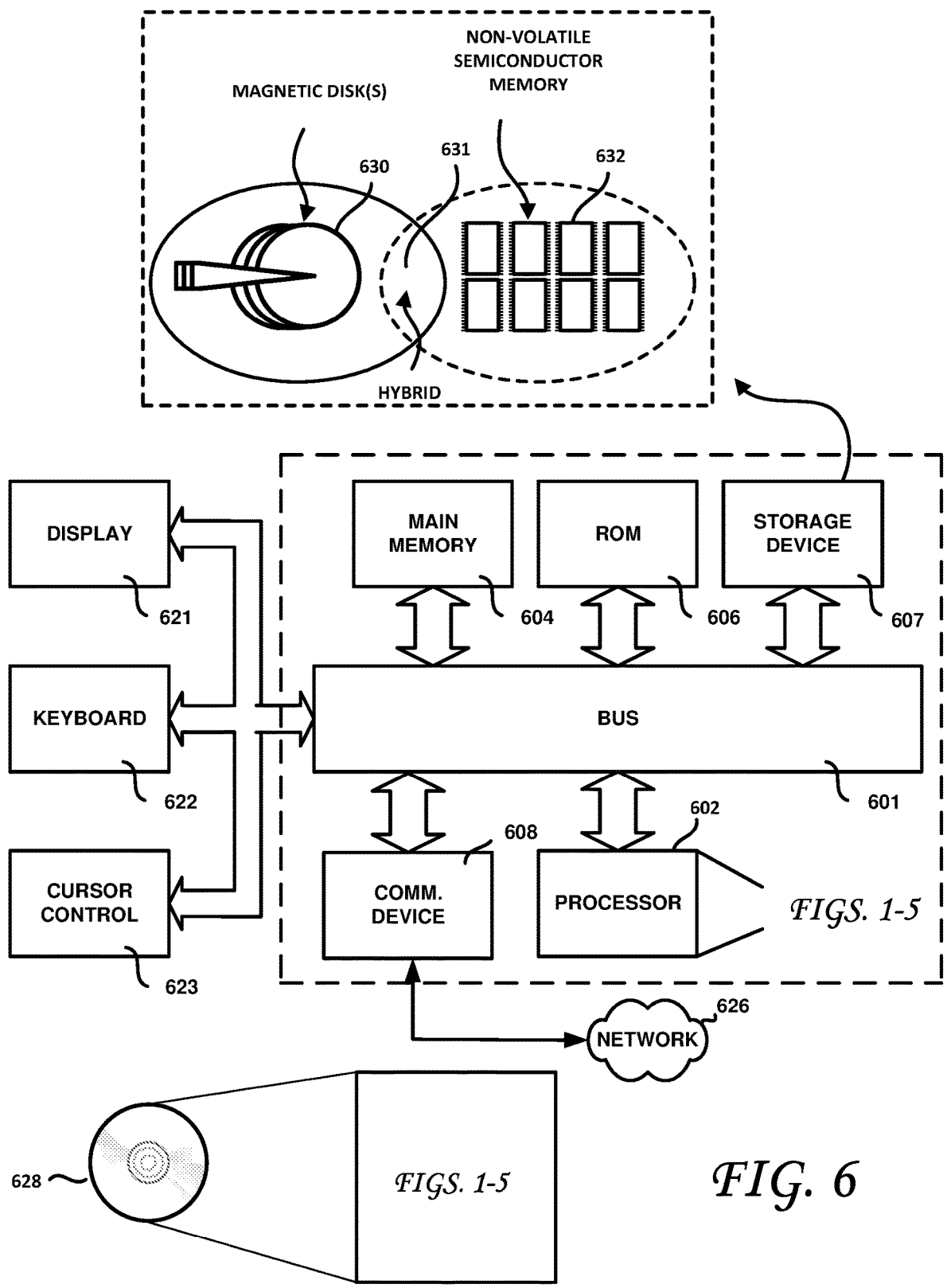
FIG. 6 is a block diagram of a computing device with which the embodiments shown and described herein may be practiced.

Other embodiments may include a computer-implemented method of implementing an online exchange in a distributed system and of implementing a blockchain distributed ledger as shown and described relative to claim 5 and a non-transitory machine-readable medium having data stored thereon representing sequences of instructions which, when executed by computing devices, cause the computing devices to implement an online exchange in a distributed system and to implement a blockchain distributed ledger, as shown and described relative to FIG. 6.

Physical Hardware

FIG. 6 illustrates a block diagram of a computing device with which embodiments may be implemented. The computing device of FIG. 6 may include a bus 601 or other communication mechanism for communicating information, and one or more processors 602 coupled with bus 601 for processing information. The computing device may further comprise a random-access memory (RAM) or other dynamic storage device 604 (referred to as main memory), coupled to bus 601 for storing information and instructions to be executed by processor(s) 602. Main memory (tangible and non-transitory, which terms, herein, exclude signals per se and waveforms) 604 also may be used for storing temporary variables or other intermediate information during execution of instructions by processor 602. The computing device of FIG. 6 may also include a read only memory (ROM) and/or other static storage device 606 coupled to bus 601 for storing static information and instructions for processor(s) 602. A data storage device 607, such as a magnetic disk and/or solid-state data storage device may be coupled to bus 601 for storing information and instructions—such as would be required to carry out the functionality shown and disclosed relative to FIGS. 1-5. The computing device may also be coupled via the bus 601 to a display device 621 for displaying information to a computer user. An alphanumeric input device 622, including alphanumeric and other keys, may be coupled to bus 601 for communicating information and command selections to processor(s) 602. Another type of user input device is cursor control 623, such as a mouse, a trackball, or cursor direction keys for communicating direction information and command selections to processor(s) 602 and for controlling cursor movement on display 621. The computing device of FIG. 6 may be coupled, via a communication interface (e.g., modem, network interface card or NIC) 608 to the network 626.

As shown, the storage device 607 may include direct access data storage devices such as magnetic disks 630, non-volatile semiconductor memories (EEPROM, Flash, etc.) 632, a hybrid data storage device comprising both magnetic disks and non-volatile semiconductor memories, as suggested at 631. References 604, 606 and 607 are examples of tangible, non-transitory computer-readable media having data stored thereon representing sequences of instructions which, when executed by one or more computing devices, implement aspects of the online exchange and methods described and shown herein. Some of these instructions may be stored locally in a client computing device, while others of these instructions may be stored (and/or executed) remotely and communicated to the client computing over the network 626. In other embodiments, all of these instructions may be stored locally in the client or other standalone computing device, while in still other embodiments, all of these instructions are stored and executed remotely (e.g., in one or more remote servers) and the results communicated to the client computing device. In yet another embodiment, the instructions (processing logic) may be stored on another form of a tangible, non-transitory computer readable medium, such as shown at 628. For example, reference 628 may be implemented as an optical (or some other storage technology) disk, which may constitute a suitable data carrier to load the instructions stored thereon onto one or more computing devices, thereby re-configuring the computing device(s) to one or more of the embodiments described and shown herein. In other implementations, reference 628 may be embodied as an encrypted solid-state drive. Other implementations are possible.

Embodiments of the present invention are related to the use of computing devices to implement online exchanges using distributed ledger technology, sometimes referred to as blockchain technology. According to one embodiment, the methods, devices and systems described herein may be provided by one or more computing devices in response to processor(s) 602 executing sequences of instructions, embodying aspects of the computer-implemented methods shown and described herein, contained in memory 604. Such instructions may be read into memory 604 from another computer-readable medium, such as data storage device 607 or another (optical, magnetic, etc.) data carrier, such as shown at 628. Execution of the sequences of instructions contained in memory 604 causes processor(s) 602 to perform the steps and have the functionality described herein. In alternative embodiments, hard-wired circuitry may be used in place of or in combination with software instructions to implement the described embodiments. Thus, embodiments are not limited to any specific combination of hardware circuitry and software. Indeed, it should be understood by those skilled in the art that any suitable computer system may implement the functionality described herein. The computing devices may include one or a plurality of microprocessors working to perform the desired functions. In one embodiment, the instructions executed by the microprocessor or microprocessors are operable to cause the microprocessor(s) to perform the steps described herein. The instructions may be stored in any computer-readable medium. In one embodiment, they may be stored on a non-volatile semiconductor memory external to the microprocessor, or integrated with the microprocessor. In another embodiment, the instructions may be stored on a disk and read into a volatile semiconductor memory before execution by the microprocessor.

Portions of the detailed description above describe processes and symbolic representations of operations by computing devices that may include computer components, including a local processing unit, memory storage devices for the local processing unit, display devices, and input devices. Furthermore, such processes and operations may utilize computer components in a heterogeneous distributed computing environment including, for example, remote file servers, computer servers, and memory storage devices. These distributed computing components may be accessible to the local processing unit by a communication network.

The processes and operations performed by the computer include the manipulation of data bits by a local processing unit and/or remote server and the maintenance of these bits within data structures resident in one or more of the local or remote memory storage devices. These data structures impose a physical organization upon the collection of data bits stored within a memory storage device and represent electromagnetic spectrum elements.

A process, such as the computer-implemented data augmentation methods described and shown herein, may generally be defined as being a sequence of computer-executed steps leading to a desired result. These steps generally require physical manipulations of physical quantities. Usually, though not necessarily, these quantities may take the form of electrical, magnetic, or optical signals capable of being stored, transferred, combined, compared, or otherwise manipulated. It is conventional for those skilled in the art to refer to these signals as bits or bytes (when they have binary logic levels), pixel values, works, values, elements, symbols, characters, terms, numbers, points, records, objects, images, files, directories, subdirectories, or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, positioning, placing, illuminating, removing, altering and the like. The operations described herein are machine operations performed in conjunction with various input provided by a human or artificial intelligence agent operator or user that interacts with the computer. The machines used for performing the operations described herein include local or remote general-purpose digital computers or other similar computing devices.

In addition, it should be understood that the programs, processes, methods, etc. described herein are not related or limited to any particular computer or apparatus nor are they related or limited to any particular communication network architecture. Rather, various types of general-purpose hardware machines may be used with program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read only memory.

While certain example embodiments have been described, these embodiments have been presented by way of example only, and are not intended to limit the scope of the embodiments disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

The invention claimed is:

1. A distributed system that implements an online exchange, comprising:
   a plurality of server nodes, each being configured to receive transaction requests over a computer network and to store a copy of a distributed ledger of completed exchange transactions, the plurality of server nodes forming a replicated state machine; and
   a consensus engine configured to receive a plurality of transaction requests and to generate an ordering of received transactions upon achieving consensus, the ordering of transactions respecting an order in which the transaction requests were issued in each of the plurality of server nodes and specifying an identical order in which each of the plurality of server nodes is to execute the transaction requests in the online exchange and to update its copy of the distributed ledger, such that each of the plurality of server nodes forming the replicated state machine evolves its state and its copy of the distributed ledger in a deterministic manner.

2. The distributed system of claim 1, wherein the consensus engine is coupled to each of the plurality of server nodes over a computer network.

3. The distributed system of claim 1, wherein the consensus engine comprises a consensus engine instance at each of the plurality of server nodes, each consensus engine instance being configured to communicate with each of the others of the plurality of consensus engine instances over a computer network.

4. The distributed system of claim 1, wherein the consensus engine is configured to achieve consensus through algorithmic consensus.

5. The distributed system of claim 1, wherein the consensus engine is configured to achieve consensus through singleton consensus.

6. The distributed system of claim 1, wherein the consensus engine is configured to achieve consensus through majority consensus.

7. The distributed system of claim 1, wherein the consensus engine is configured to achieve consensus through unanimous consensus.

8. The distributed system of claim 1, further comprising application software at each of the plurality of server nodes, each application software being configured to independently execute the ordered transaction requests.

9. The distributed system of claim 1, wherein the plurality of server nodes execute and maintain a permissioned blockchain that evolves according to their respective copies of the distributed ledger.

10. The distributed system of claim 1, wherein each of the plurality of server nodes is configured to asynchronously update their respective copies of the distributed ledger.

11. The distributed system of claim 1, wherein each of the plurality of server nodes is further configured to maintain updates to their respective copies of the distributed ledger as entries in a journal locally stored in persistent memory.

12. The distributed system of claim 10, wherein the distributed ledgers stored by the server nodes are independent of the journals stored locally at least of the plurality of server nodes and do not depend on updates to the locally stored journals for consistency across the plurality of server nodes.

13. The distributed system of claim 1, wherein the order in which the plurality of server nodes are to execute the transaction requests in the online exchange prioritizes at least one of competitiveness of the received transaction requests and time of submission of the transaction requests.

14. A computer-implemented method of implementing an online exchange in a distributed system, the method comprising:
receiving transaction requests over a computer network in a plurality of server nodes, each being configured to store a copy of a distributed ledger of completed exchange transactions, the plurality of server nodes forming a replicated state machine;
receiving, by a consensus engine, a plurality of transaction requests from the plurality of server nodes;
achieving consensus and generating by the consensus engine, an ordering of transaction requests that includes the plurality of transaction requests, the ordering of transaction requests specifying an identical order in which each of the plurality of server nodes is to execute the transactions in the online exchange and to update its copy of the distributed ledger; and
each of the plurality of server nodes forming the replicated state machine evolving its state and its copy of the distributed ledger in a deterministic manner.

15. The computer-implemented method of claim 14, wherein the consensus engine is coupled to each of the plurality of server nodes over a computer network.

16. The computer-implemented method of claim 14, wherein the consensus engine comprises a consensus engine instance at each of the plurality of server nodes, each consensus engine instance being configured to communicate with each of the others of the plurality of consensus engine instances over a computer network.

17. The computer-implemented method of claim 14, wherein achieving consensus is carried out through algorithmic consensus.

18. The computer-implemented method of claim 14, wherein achieving consensus is carried out through singleton consensus.

19. The computer-implemented method of claim 14, wherein achieving consensus is carried out through majority consensus.

20. The computer-implemented method of claim 14, wherein achieving consensus is carried out through unanimous consensus.

21. The computer-implemented method of claim 14, further comprising independently executing the ordered transaction requests by application software at each of the plurality of server nodes.

22. The computer-implemented method of claim 14, wherein the plurality of server nodes execute and maintain a permissioned blockchain that evolves according to their respective copies of the distributed ledger.

23. The computer-implemented method of claim 14, further comprising each of the plurality of server nodes asynchronously updating their copy of the distributed ledger.

24. The computer-implemented method of claim 14, further comprising each of the plurality of server nodes maintaining updates to their copy of the distributed ledger as entries in a journal locally stored in persistent memory.

25. The computer-implemented method of claim 24, wherein the distributed ledgers stored by the server nodes are independent of the journals stored locally at least of the plurality of server nodes and do not depend on updates to the locally stored journals for consistency across the plurality of server nodes.

26. The computer-implemented method of claim 14, further comprising prioritizing at least one of competitiveness of the received transaction requests and time of submission of the transaction requests when generating the ordering of the transaction requests.

* * * * *